UNITED STATES PATENT OFFICE.

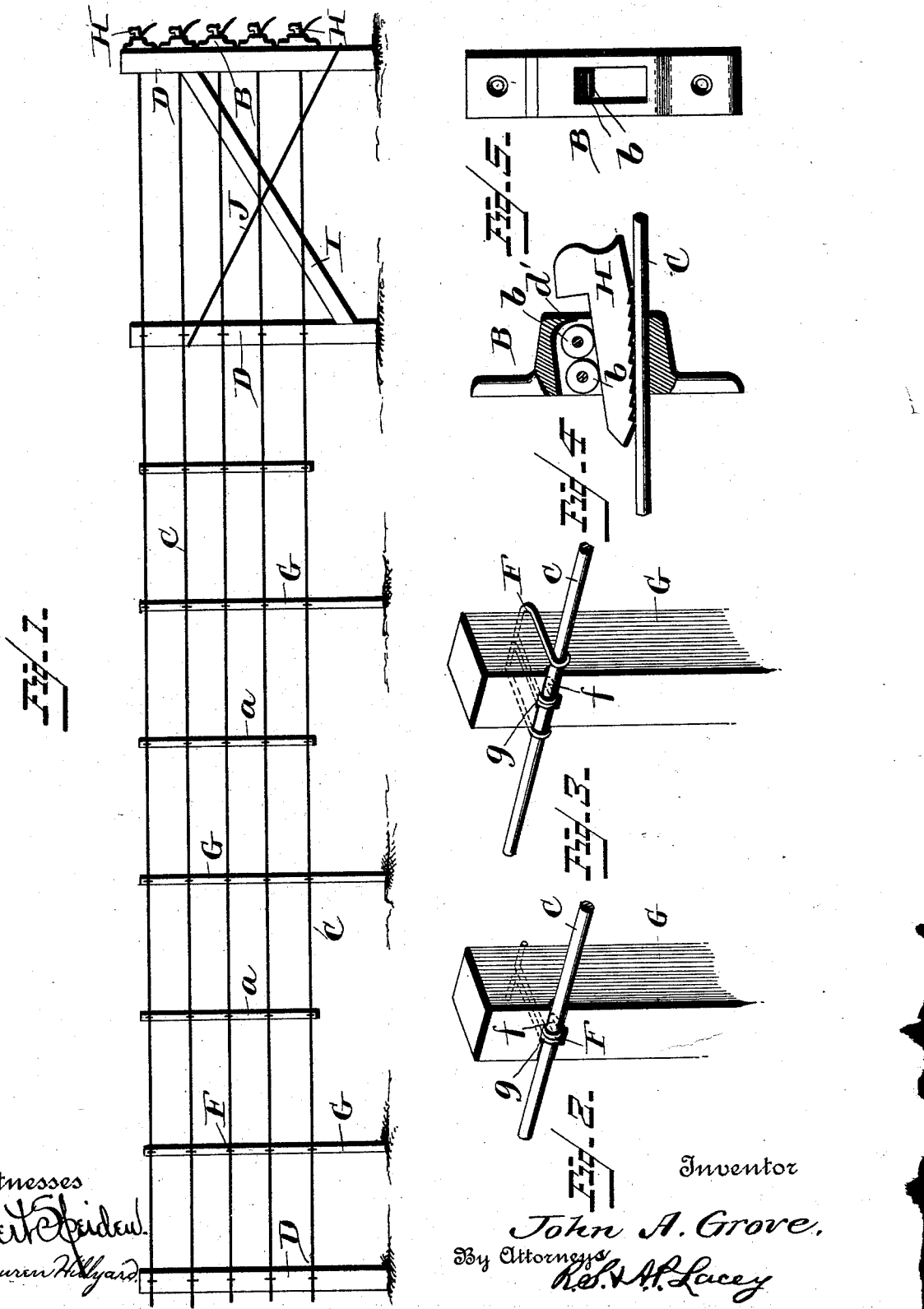

JOHN ARNOLD GROVE, OF BLUFFTON, INDIANA.

WIRE FENCE.

SPECIFICATION forming part of Letters Patent No. 509,731, dated November 28, 1893.

Application filed December 30, 1892. Serial No. 456,817. (No model.)

*To all whom it may concern:*

Be it known that I, JOHN ARNOLD GROVE, a citizen of the United States, residing at Bluffton, in the county of Wells and State of Indiana, have invented certain new and useful Improvements in Wire Fences; and I do hereby declare the following to be a full, clear, and exact description of the invention, such as will enable others skilled in the art to which it appertains to make and use the same.

This invention relates to wire fences and is designed to provide improved means for securing the ends of the fence wires to the required post or posts in such a manner that the wires may be released at a moment's notice for purposes of repair and regulating the tension as may be required.

The improvement consists of a socket having anti friction rollers at one side, and a wedged or tapering key to be driven into said socket and fasten the fence wire therein.

The improvement further consists in the novel features and the peculiar construction and combination of the parts which will be hereinafter more fully described and claimed and which are shown in the annexed drawings, in which—

Figure 1 is an elevation of a portion of fence embodying my invention. Fig. 2 is a detail view showing the preferred form of fastening for securing the fence wires to the stay. Fig. 3 is a detail view of a modified form of fastening in which the ends of the wires forming the hooks are carried forward along the sides of the stays and bent around the fence wire. Fig. 4 is a side elevation of a holder on an enlarged scale, the obverse side of the socket being removed to expose the anti friction rollers and show the relative location of the key. Fig. 5 is a rear view of the socket.

The fence wires C are strung upon the posts D in any of the usual ways which will admit of the said wires being tightened from one end. In constructing the fence the posts D are set farther apart than is usual and the fence wires are supported between said posts by stays G which are sufficiently long to touch the ground and prevent the fence wires from sagging. These stays G in addition to supporting the fence wires and preventing them from sagging also serve to hold the said fence wires at a fixed relative distance apart. To further fix the relative distance of fence wires shorter stays $a$ are located intermediate of the stays G. These stays $a$ extend below the lowest fence wire just far enough to admit of the said wire being firmly secured thereto. The fence wires are secured to the stays $a$ and G in precisely the same manner, the latter being provided with transverse notches to receive the fence wires which latter are secured thereto by fastenings F. The fastenings F are formed of wire which is doubled upon itself and provided at one end with a hook $f$ which is adapted to embrace the fence wires. The ends of the wire after passing through transverse openings $g$ in the stays are bent in opposite directions, as shown in Fig. 2, to fix the position of the said fastening. For greater security the ends of the wire forming the fastening F may be carried forward along the side of the stay and bent around the fence wire, as shown in Fig. 3. The opening $g$ is preferably formed at a slight incline through the stay and is enlarged at the end opening out on the notched side of the stay to receive the hook $f$.

The holder for securing the end of the fence wire to the post at the end of the line of fences, or to any post desired, is composed of a socket B which has flanged ends by means of which it is secured to the fence posts by suitable fastenings. The mortise or opening in the socket B has one wall formed at right angles to the inner face of the socket and has the opposite wall slightly inclined whereby said mortise or opening is wider at the outer than at the inner end. Anti friction rollers $b$ are journaled in the socket and form one wall of the opening therein. These rollers admit of the key H being readily pressed into the opening in the socket. The flange $d'$ at the outer end of the opening in the socket protects the outer anti friction roller and prevents foreign matter from being lodged between said roller and the socket. The key H is wedge shaped or tapering and is serrated on one side to engage positively with the fence wire. The outer end of the key is enlarged to be readily grasped between the fingers when it is desired to withdraw the key from the socket.

In constructing the fence the posts D are set up along the prescribed line and the fence wires are strung thereon in the usual manner, one end being made fast to the outer end post and the other end being secured to the other end post or to any intermediate fence post by means of the holder B. The stays G and *a* are applied to the fence wires and secured thereto in the manner hereinbefore set forth. The end posts are braced from the next post by means of the diagonal posts I and the stay wire J.

Having thus described my invention, what I claim, and desire to secure by Letters Patent, is—

In a wire fence, the combination with the posts and the wires stretched on the said posts, of a holder to secure the end of the wires to the post, consisting of a casting having apertured flanges to receive the fastenings by means of which the holder is secured to the said post, and having a mortise, one wall of the mortise being straight, a series of rollers journaled in the said mortise and forming the other wall, and having a flange at the outer end of the mortise to protect and conceal the rollers, and a tapering key to be thrust into the said mortise to secure the wire therein, said key obtaining a bearing on the said series of rollers, substantially as described.

In testimony whereof I affix my signature in presence of two witnesses.

JOHN ARNOLD GROVE.

Witnesses:
W. H. Fox,
J. H. C. Smith.